(12) United States Patent
Pandey et al.

(10) Patent No.: US 10,019,295 B2
(45) Date of Patent: *Jul. 10, 2018

(54) METHOD AND SYSTEM FOR MANAGING AND LINKING SOFTWARE APPLICATIONS

(71) Applicant: SVG Media Pvt Ltd, New Delhi (IN)

(72) Inventors: Vaibhav Pandey, Gurgaon (IN); Siddharth Puri, Gurgaon (IN)

(73) Assignee: SVG Media Pvt. Ltd. (IN)

( * ) Notice: Subject to any disclaimer, the term of this patent is extended or adjusted under 35 U.S.C. 154(b) by 0 days.

This patent is subject to a terminal disclaimer.

(21) Appl. No.: 15/676,735

(22) Filed: Aug. 14, 2017

(65) Prior Publication Data

US 2017/0364397 A1 Dec. 21, 2017

Related U.S. Application Data

(63) Continuation of application No. 15/063,357, filed on Mar. 7, 2016, now Pat. No. 9,733,998.

(30) Foreign Application Priority Data

Sep. 24, 2015 (IN) .......................... 3049/DEL/2015

(51) Int. Cl.
*G06F 9/46* (2006.01)
*G06F 9/54* (2006.01)

(52) U.S. Cl.
CPC .............. *G06F 9/543* (2013.01); *G06F 9/545* (2013.01)

(58) Field of Classification Search
CPC ....................................................... G06F 9/541
USPC ........................................................ 719/328
See application file for complete search history.

(56) References Cited

U.S. PATENT DOCUMENTS

| 7,167,842 | B1 | 1/2007 | Josephson, II et al. |
| 9,152,786 | B2 | 10/2015 | Zeng et al. |
| 9,230,022 | B1 | 1/2016 | Banerjee et al. |
| 9,292,467 | B2 | 3/2016 | Connolly et al. |
| 9,733,998 | B2 | 8/2017 | Pandey et al. |
| 2014/0075574 | A1 | 3/2014 | Zheng et al. |

*Primary Examiner* — Andy Ho

(74) *Attorney, Agent, or Firm* — Kolisch Hartwell, P.C.

(57) ABSTRACT

A computer-readable storage medium encodes computer executable instructions that, when executed by at least one processor, associate plural applications. That associating method includes receiving an application programming interface associated with each of the plural applications. The method also includes unifying the received application programming interface associated with each of the plural applications, and classifying the application programming interface associated with each of the plural applications. The plural applications are classified into one or more categories. Further, the method includes associating the application programming interfaces based upon the classifying and a pre-determined set of rules.

10 Claims, 8 Drawing Sheets

METHOD AND SYSTEM FOR MANAGING AND LINKING SOFTWARE APPLICATIONS

CROSS-REFERENCE TO RELATED APPLICATIONS

This application is a continuation of U.S. patent application Ser. No. 15/063,357, filed Mar. 7, 2016, now U.S. Pat. No. 9,733,998, which application is incorporated herein by reference in its entirety for all purposes.

TECHNICAL FIELD

The present invention relates to the field of mobile applications. More specifically, the present disclosure relates to a method and system for managing and associating a plurality of applications.

BACKGROUND

With the advancements in technology over the last decade, a large quantity of users has resorted towards using a variety of communication devices. These communication devices include smart phone, tablets, laptop and the like. Also, these communication devices enable the users to access a number of mobile applications. The users fulfill their day to day needs by availing services provided by these applications. In addition, these applications are provided by various companies for promoting their products and services to the users. These companies run their business by generating revenue through these interactive applications. These companies offer a range of on demand service applications to the users. These on demand service applications accomplish the demands of the users by charging a pre-defined amount of money in real time. Moreover, each application belongs to a specific class or category of service provided by the application provider. These applications include taxi based service applications, food service based applications, housing services based applications and the like. In general, these mobile applications are developed through an application programming interface. Nowadays, many application developers or providers have started providing their application programming interfaces to other developers to some extent. The application developers allow other developers to utilize their application programming interface for running their business. For example, an application developer may utilize Google Maps API on their application for providing real time directions for users. Moreover, these are open source APIs which can be used by various application developers for building their application.

SUMMARY

In an example, a computer-readable storage medium is provided. The computer-readable storage medium encodes computer executable instructions that, when executed by at least one processor, performs a method. The method associates a plurality of applications. The method may include a first step of reception of an application programming interface associated with each of the plurality of applications. In addition, the method may include a second step of unification of the received application programming interface associated with each of the plurality of applications. Moreover, the method may include a third step of classification of the application programming interface associated with each of the plurality of applications. The plurality of applications is classified into a corresponding category of application of one or more categories of applications associated with the corresponding plurality of applications. Further, the method may include another step of association of the application programming interface associated with each of the plurality of applications based on the classification and a pre-determined set of rules. The association is done by cross linking the application programming interface associated with each of the plurality of applications.

In an embodiment of the present disclosure, the computer readable storage medium of further includes instructions for determination of the corresponding category of application for the application programming interface associated with each of the plurality of applications. Each of the plurality of applications is an on demand service application.

In an embodiment of the present disclosure, one or more application programming interfaces associated with a first category of application are cross linked with one or more application programming interfaces associated with a second category of applications. The first category of application is distinct from the second category class of application.

In an embodiment of the present disclosure, the one or more application programming interfaces associated with the first category of application are cross linked with one or more application programming interfaces associated with a plurality of categories of applications. The first category of application is distinct from each of the plurality of categories of applications. Each category of application of the plurality of categories of applications is a distinct category of application.

In an embodiment of the present disclosure, the pre-determined set of rules are defined based on a current location of a user accessing one or more applications of the plurality of applications, a current time of accessing the one or more applications of the plurality of applications, a gender of the user accessing the one or more applications of the plurality of applications and an age of the user accessing the one or more applications of the plurality of applications.

In an embodiment of the present disclosure, the pre-determined set of rules is set by an administrator.

In an embodiment of the present disclosure, the pre-determined set of rules is set by an application provider associated with each of the plurality of applications.

In an embodiment of the present disclosure, the application programming interface associated with each of the plurality of applications is received from a corresponding application server of a plurality of application servers associated with the corresponding plurality of applications.

In an embodiment of the present disclosure, the computer readable storage medium further includes instructions for generation of a common application programming interface for each of one or more application programming interfaces classified into a corresponding similar category of application.

In an embodiment of the present disclosure, the computer readable storage medium further includes instructions for storage of the application programming interface associated with each of the plurality of applications, each of the classified application programming interface, each of the unified application programming interfaces, each of the associated application programming interfaces and the pre-determined set of rules.

BRIEF DESCRIPTION OF THE DRAWINGS

Having thus described the invention in general terms, reference will now be made to the accompanying drawings, which are not necessarily drawn to scale, and wherein:

There may be additional structures described in the description that are not depicted in the drawings, and the absence of such a drawing should not be considered as an omission of such design from the specification.

DETAILED DESCRIPTION

Before describing embodiments of the present disclosure in detail, it should be observed that the present embodiments of the present disclosure may utilize apparatus components and method steps related to wireless power charging. Accordingly, the apparatus components have been represented where appropriate by conventional symbols in the drawings, showing specific details that are pertinent for an understanding of the present disclosure so as not to obscure the disclosure with details that will be readily apparent to those with ordinary skill in the art having the benefit of the description herein.

Detailed embodiments are disclosed herein; however, it is to be understood that the disclosed embodiments are merely exemplary of the claimed elements, which can be embodied in various forms. Therefore, specific structural and functional details disclosed herein are not to be interpreted as limiting, but merely as a basis for the claims and as a representative basis for teaching one skilled in the art to variously employ the disclosed concepts in an appropriate structure. Further, the terms and phrases used herein are not intended to be limiting but rather to provide an understandable description of the subject matter.

Figure 1:
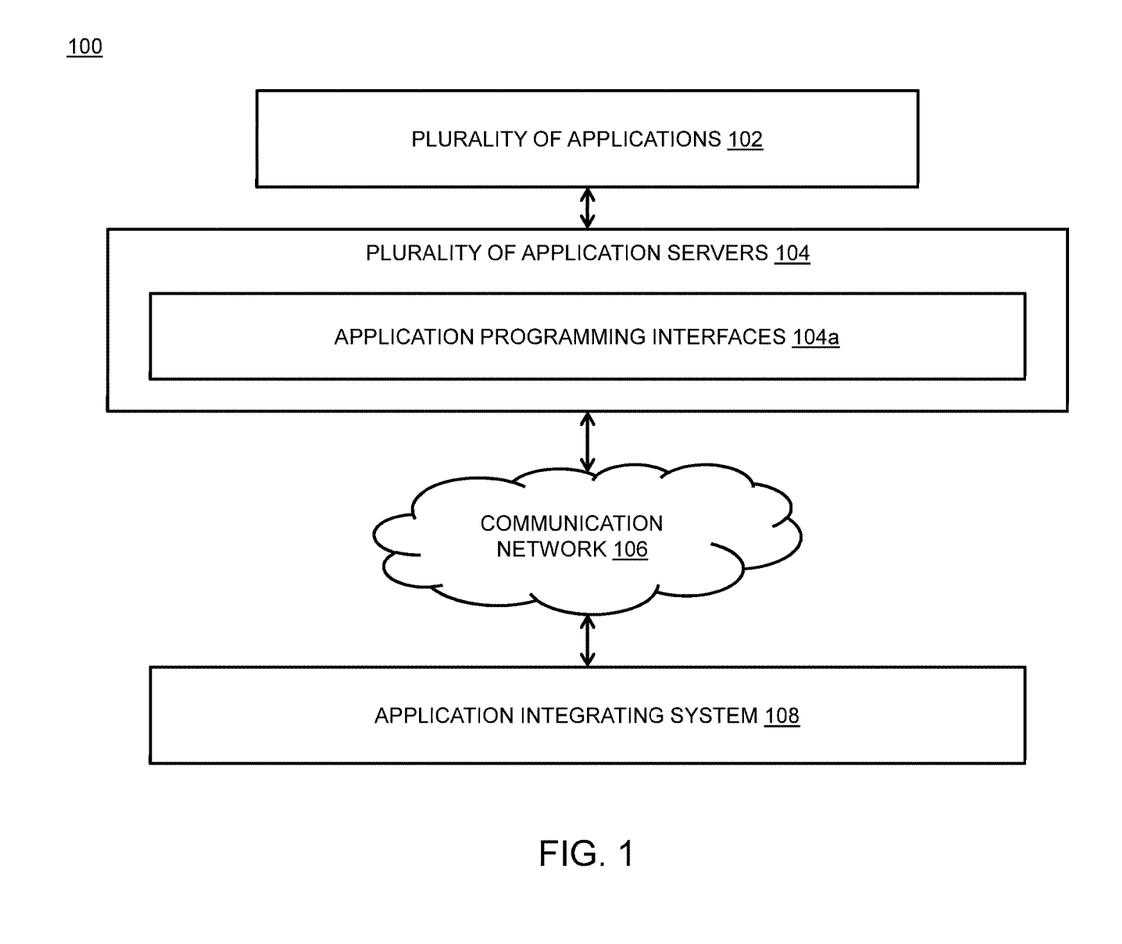
FIG. 1 illustrates a general overview of a system for associating a plurality of applications, in accordance with various embodiments of the present disclosure.

FIG. 1 illustrates a general overview of a system 100 for associating a plurality of applications, in accordance with various embodiments of the present disclosure. The plurality of applications is associated with a corresponding category of application of one or more categories of applications. The system 100 includes a plurality of applications 102, a plurality of application servers 104, a communication network 106 and an application integrating system 108. In addition, the application integrating system 108 performs the association of the plurality of applications associated with the corresponding category of the one or more categories.

Going further, the plurality of applications 102 correspond to a plurality of mobile applications configured to run on a plurality of portable communication devices. Examples of the plurality of portable communication devices include a smart phone, a tablet, a laptop, a smart watch and the like. Moreover, each of the plurality of applications is associated with a corresponding operating system of a plurality of operating systems. The plurality of operating systems include but may not be limited to an Android operating system, iOS, Windows operating system, Bada operating system, Symbian operating system and the like.

Each of the plurality of portable communication devices is connected to the internet in real time. In an embodiment of the present disclosure, each of the plurality of portable communication devices is associated with a corresponding plurality of users who access one or more applications of the plurality of applications. In an embodiment of the present disclosure, the plurality of applications 102 is installed on the corresponding plurality of portable communication devices. In another embodiment of the present disclosure, a number of applications of the plurality of applications 102 are installed in a particular portable communication device of the plurality of portable communication devices. The number of applications is installed based on a choice of a user of the plurality of users.

In addition, each of the plurality of applications 102 is an on demand service application. Further, the on demand service applications include one or more taxi service applications, one or more food based service applications and one or more travel planning based applications. Moreover, each of the plurality of applications 102 include one or more home service applications and other one or more applications known in the art employed in providing one or more services to the plurality of users. In an embodiment of the present disclosure, each of the plurality of users access one or more applications of the plurality of applications 102 for utilizing one or more services based on their choice.

Going further, each of the plurality of applications 102 is associated with an application server of the corresponding plurality of application servers 104. In an embodiment of the present disclosure, an application of the plurality of applications 102 is stored in the corresponding application server of the plurality of application servers 104. In an embodiment of the present disclosure, each application server of the plurality of application servers 104 is configured to run the corresponding application of the plurality of applications 102. Also, each application server of the plurality of application servers 104 handles all application operations between the plurality of users and an organization's backend business applications. In an embodiment of the present disclosure, each of the plurality of application servers 104 is remotely located from each other.

In an embodiment of the present disclosure, each of the plurality of application servers 104 is operated or controlled by a corresponding application provider associated with each of the plurality of applications 102. In an embodiment of the present disclosure, each of the plurality of application server 104 is controlled or monitored by a corresponding application administrator at a remote location. Moreover, the plurality of application servers 104 is associated with application programming interfaces 104a. In an embodiment of the present disclosure, each application programming interface of the application programming interfaces 104a is associated with the corresponding application of the plurality of applications 102. Each application programming interface of the application programming interfaces 104a is stored in the corresponding application server of the plurality of application servers 104.

Further, each of the plurality of applications 102 are based on a specific application programming interface designed for a specific type or category of application. The application programming interface is a set of commands, functions and protocols used by a plurality of application providers. The plurality of application providers utilize the application programming interface for using one or more pre-defined functions for building one or more applications for a specific type of operating system. In an embodiment of the present disclosure, each of the application programming interfaces 104a is an open application programming interface based on a pre-determined criterion (mentioned below in the patent application).

In an embodiment of the present disclosure, the plurality of application providers enable the corresponding application programming interfaces 104a to be utilized by other application developers. In an embodiment of the present disclosure, the plurality of application providers may allow an exclusive access of their application programming interfaces to other one or more application providers or developers. In addition, the exclusive access is provided based on exclusive dealing between the one or more application providers and the other one or more application providers (as described below in the detailed description of FIG. 2A).

In an embodiment of the present disclosure, each of the application programming interfaces is associated with a specific key. In an embodiment of the present disclosure, each of the plurality of application providers provides the specific key to other developers for gaining access to the application programming interfaces. In an embodiment of the present disclosure, the specific key is an application programming interface key which is a code passed for identifying a calling program and the corresponding application developer. In an embodiment of the present disclosure, the application programming interface key is used for tracking and controlling how the application programming interface is used.

In an embodiment of the present disclosure, each of the application programming interfaces 104a is identified using the application programming interface key. In an embodiment of the present disclosure, the application programming interface key for each of the application programming interfaces 104a is stored in the corresponding application server of the plurality of application servers 104. In an embodiment of the present disclosure, the application programming key is fetched from the application server of the corresponding plurality of application servers 104. In an embodiment of the present disclosure, the application programming key is fetched for gaining access to the application programming interface of the application programming interfaces 104a.

Going further, each of the plurality of application servers 104 is associated with the communication network 106. In an embodiment of the present disclosure, each application of the plurality of applications 102 is associated with the corresponding application server of the plurality of application servers 104 through the communication network 106. Moreover, the communication network 106 enables a medium for transfer of information between each of the plurality of applications 102 and each of the plurality of application servers 104. In an embodiment of the present disclosure, the communication network 106 enables working of the each of the plurality of applications 102.

Further, the medium for communication may be infrared, microwave, radio frequency (RF) and the like. The communication network 106 includes but may not be limited to a local area network, a metropolitan area network, a wide area network and a virtual private network. The communication network 106 includes a global area network, a home area network or any other communication network presently known in the art. The communication network 106 is a structure of various nodes or communication devices connected to each other through a network topology method. Examples of the network topology include a bus topology, a star topology, a mesh topology and the like.

In an embodiment of the present disclosure, each of the plurality of applications 102 is accessed by the plurality of users through the communication network 106. In an embodiment of the present disclosure, each of the plurality of applications 102 is connected to the internet through the communication network 106. In an embodiment of the present disclosure, each of the plurality of portable communication devices is connected to the internet through the communication network 106.

Moreover, each of the plurality of applications 102 is associated with the application integrating system 108. In an embodiment of the present disclosure, each of the plurality of applications 102 is associated with the application integrating system 108 through the communication network 106. In addition, each of the plurality of application servers 104 is associated with the application integrating system 108. In an embodiment of the present disclosure, each of the plurality of application servers 104 is associated with the application integrating system 108 through the communication network 106.

Going further, in an embodiment of the present disclosure, the application integrating system 108 is linked with each of the plurality of application servers 104. In an embodiment of the present disclosure, each of the plurality of application providers enable or allow the application integrating system 108 to fetch one or more information each of the plurality of application servers 104 (mentioned below in the patent application). Moreover, the application integrating system 108 performs the association of the plurality of applications associated with the corresponding category of the one or more categories of applications.

In addition, the application integrating system 108 includes a central server for performing one or more operations. The one or more operations perform the association of the plurality of applications associated with the corresponding category of the one or more categories of applications. Further, the application integrating system 108 is configured to fetch the application programming interface associated with each of the plurality of applications 102 (described below in the patent application). Furthermore, the application integrating system 108 is configured to consolidate the application programming interface associated with each of the plurality of applications 102 (as mentioned below in the patent application).

Moreover, the application integrating system 108 is configured to classify each of the application programming interfaces 104a into a corresponding category of applications of the one or more categories of applications. The classification is done based on a first pre-defined criterion (described below in the detailed description of FIG. 2A). In addition, the application integrating system 108 associates the application programming interface associated with each of the plurality of applications 102 based on a second pre-defined criteria (mentioned below in the detailed description of FIG. 2A).

Further, the application integrating system 108 is configured to store a set of information associated with the one or more operations performed by each of one or more components of the application integrating system 108 (described below in the patent application). In an embodiment of the present disclosure, the application integrating system 108 enables unification of the application programming interfaces 104a associated with the corresponding plurality of applications 102. In an embodiment of the present disclosure, the application integrating system 104 enables the application of the plurality of applications 102 to utilize one or more services or features of other one or more application of the plurality of applications 102 at the same time (as described in detail in the detailed description of FIG. 2A).

It may be noted that in FIG. 1, the application of the plurality of applications 102 is associated with the application provider of the plurality of application providers; however those skilled in the art would appreciate that there are more number of applications associated with the application provider of the plurality of application providers. It may be noted that in FIG. 1, the application server of the plurality of application servers 104 is associated with the corresponding application of the plurality of applications 102; however those skilled in the art would appreciate that there more number of applications associated with a single application server.

Figure 2:
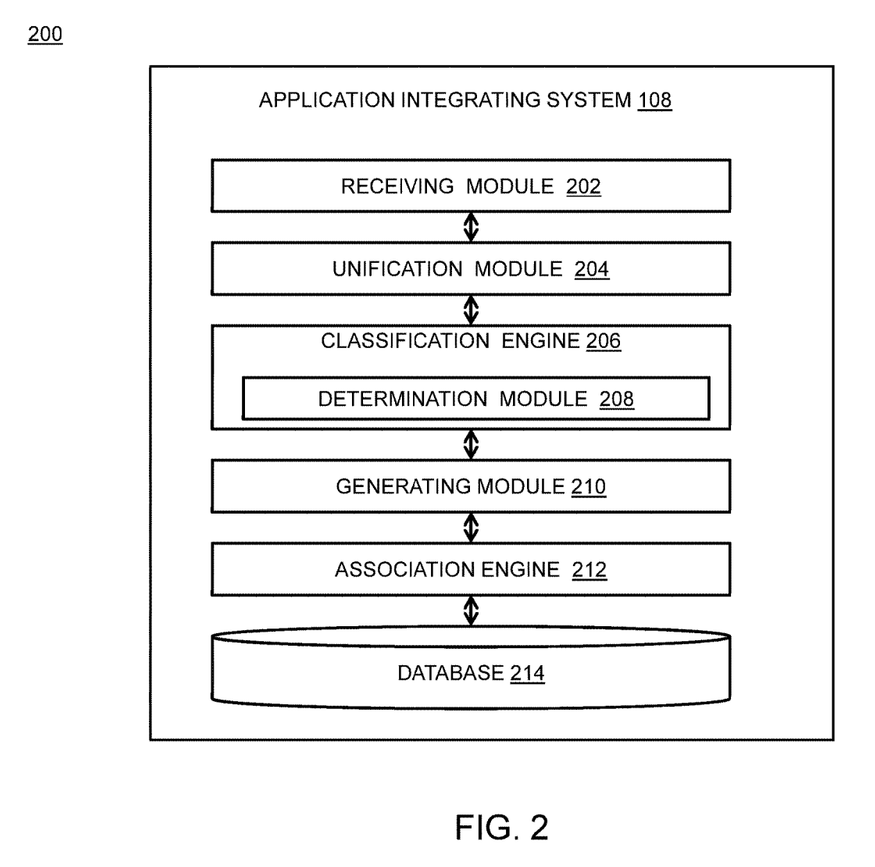
FIG. 2 illustrates a block diagram of an application integrating system, in accordance with various embodiments of the present disclosure.

FIG. 2 illustrates a block diagram 200 of the application integrating system 208, in accordance with various embodiments of the present disclosure. The block diagram 200 represents one or more modular components of the application integrating system 108. The one or more components of the application integrating system 108 includes a receiving module 202, a unification module 204, a classification module 206, a determination module 208, a generating module 210, an association engine 212 and a database 214. It may be noted that to explain the system elements of FIG. 2, references will be made to the system elements of FIG. 1. In an embodiment of the present disclosure, the one or more components of the application integrating system 108 enable the association of the plurality of applications 102.

Going further, each of the plurality of application servers 104 associated with the corresponding plurality of applications 102 is connected to the application integrating system 108 through the communication network 106. In addition, each of the plurality of application servers 104 includes the application programming interface of the application programming interfaces 104a associated with the corresponding application of the plurality of applications 102. Moreover, the receiving module 202 of the application integrating system 108 is configured to fetch the application programming interface associated with each of the plurality of applications 102. In an embodiment of the present disclosure, the application programming interface associated with each of the plurality of applications 102 are fetched in real time.

In an embodiment of the present disclosure, the application programming interface is fetched from the corresponding application server of the plurality of application servers 104. In an embodiment of the present disclosure, the application programming interface associated with each of the plurality of applications 102 are fetched through the communication network 106. In an embodiment of the present disclosure, the application programming interface associated with each of the plurality of applications 102 is stored in a database associated with each of the plurality of application servers 104.

In an embodiment of the present disclosure, each of the plurality of application providers enable the receiving module 202 to fetch their corresponding application interface of the application programming interfaces 104a. In an embodiment of the present disclosure, each of the application programming interfaces 104a are open application programming interfaces for fetching the application programming interface. In an embodiment of the present disclosure, each of the application programming interfaces 104a is fetched from a remote location based on a location of each of the plurality of application servers 104.

For example, an application A1 associated with an application programming interface AP1 is stored on an application server S1, an application A2 associated with an application programming interface AP2 is stored on an application server S2, an application A3 associated with an application programming interface AP3 is stored on an application server S3, an application A4 associated with an application programming interface AP4 is stored on an application server S4, an application A5 associated with an application programming interface AP5 is stored on an application server S5 and an application A6 associated with an application programming interface AP6 is stored on an application server S6. Further, the application A1 and the application A2 is associated with a similar category of application C1 (say, taxi service based application), the application A3 and the application A4 is associated with a similar category of application C2 (say, a food service based application) and the application A5 and the application A6 is associated with a similar category of application C3 (say, a home services based application). The receiving module 202 fetches the application programming interface AP1 from the application server S1, the application programming interface AP2 from the application server S2, the application programming interface AP3 from the application server S3, the application programming interface AP4 from the application server S4, the application programming interface AP5 from the application server S5 and the application programming interface AP6 from the application server S6.

Moreover, the unification engine 204 of the application integrating system 108 unifies the received application programming interface associated with each of the plurality of applications 102. In an embodiment of the present disclosure, the unification module 204 accumulates the application programming interface associated with each of the plurality of applications 102. In an embodiment of the present disclosure, the consolidation is performed for allowing each of the application providers to integrate their application programming interface on the application integrating system 108.

In an embodiment of the present disclosure, each application programming interface of the application programming interfaces 104a is associated with a category of application of the one or more categories of applications. In an embodiment of the present disclosure, the unification module 204 unifies the application programming interfaces associated with each of the plurality of applications 102 at a single place. In an embodiment of the present disclosure, the unification module 204 selectively unifies the application programming interface based on the category of application associated with each application programming interface.

In an embodiment of the present disclosure, the unification module 204 unifies the application programming interface if each of the plurality of applications 102 is the on demand service applications. In an embodiment of the present disclosure, the unification module 204 does not unify if one or more applications of the plurality of applications 102 are not on demand service applications. In an embodiment of the present disclosure, the unification is done at regular intervals of time. In another embodiment of the present disclosure, the consolidation is done as soon as the application programming interface associated with each of the plurality of applications 102 are fetched from each of the plurality of application servers 104.

Going further, the classification engine 206 classifies the application programming interface associated with each of the plurality of applications 102 into the corresponding category of application of the one or more categories of applications. In an embodiment of the present disclosure, the classification engine 206 classifies the application programming interface associated with each of the plurality of applications 102 based on a specific category of application. Moreover, the specific category of application corresponds to a specific category of on demand service applications. In an embodiment of the present disclosure, the classification is performed based on a pre-defined list of categories of applications pre-stored in the application integrating system 108. In an embodiment of the present disclosure, the classification engine 206 matches the category of application against the pre-defined list of categories of applications. Accordingly, the classification engine 206 categorizes the application programming interface based on the matching.

In an embodiment of the present disclosure, information associated with the category of application is fetched along with the application programming interface. In an embodiment of the present disclosure, the application programming interface associated with a same category of application are stored separately from other application programming interface associated with another same category of application. Further, the classification engine 206 includes the determination module 208 configured to determine the corresponding category of application for the application programming interface associated with each of the plurality of applications 102. In an embodiment of the present disclosure, the categorization of the application programming interface is performed after the determination of the category of application associated with each of the plurality of applications 102. In an embodiment of the present disclosure, the category of application is determined by using the pre-defined list of categories of applications stored in the application integrating system 108.

In an embodiment of the present disclosure, the one or more categories of applications are provided by the corresponding plurality of application servers 104. In an embodiment of the present disclosure, the one or more categories of applications are defined by the application provider associated with each of the plurality of applications 102. In another embodiment of the present disclosure, the one or more categories of applications are defined by an administrator associated with the application integrating system 108.

Continuing the above stated example, the unification module 204 consolidates the application programming interface AP1, the application programming interface AP2, the application programming interface AP3, the application programming interface AP4, the application programming interface AP5 and the application programming interface AP6. Moreover, the classification engine 206 categorizes the application programming interface AP1 and the application programming interface AP2 into the category of application C1, categorizes the application programming interface AP3 and the application programming interface AP4 into the category of application C2 (food service based application) and categorizes the application programming interface AP5 and the application programming interface AP6 into the category of application C3 (home services based application).

Going further, the generating module 210 generates a common application programming interface for each of the one or more application programming interfaces categorized into the corresponding distinct category of application. In an embodiment of the present disclosure, the one or more application programming interfaces associated with the similar category of application are unified. Accordingly, a single application programming interface is generated. In an embodiment of the present disclosure, the generation of the common application programming interface enables cross relationship between a first category of application and a second category of application.

Moreover, the association engine 212 associates the application programming interface associated with each of the plurality of applications 102 based on the categorization and a pre-determined set of rules. In addition, the association is done by cross linking the application programming interface associated with each of the plurality of applications 102. In an embodiment of the present disclosure, the association engine 212 enables unification of the one or more application programming interfaces. In an embodiment of the present disclosure, the one or more application programming interfaces associated with a first category of application are cross linked with the one or more application programming interfaces associated with a second category of applications. In another embodiment of the present disclosure, the first category of application is distinct from the second category of application. In an embodiment of the present disclosure, a selective number of the one or more application programming interfaces are cross linked with a selective number of the other one or more application programming interfaces.

In an embodiment of the present disclosure, the one or more application programming interfaces associated with the first category of application are cross linked with the one or more application programming interfaces associated with a plurality of categories of applications. In another embodiment of the present disclosure, the first category of application is distinct from each of the plurality of categories of applications. In yet another embodiment of the present disclosure, each category of application of the plurality of categories of applications is a distinct category of application.

In an embodiment of the present disclosure, the one or more application programming interfaces associated with the first category of application are cross linked with each of the one or more applications associated with the plurality of categories of applications based on the pre-defined set of rules. In another embodiment of the present disclosure, the one or more application programming interfaces associated with the first category of application are cross linked with the one or more application programming interfaces associated with the second category of application and the one or more application programming interfaces associated with a third category of application. In yet another embodiment of the present disclosure, a selective number of the one or more application programming interfaces associated with the first category of application are cross linked with a selective number of the one or more application programming interfaces associated with the second category of applications and a selective number of the one or more application programming interfaces associated with the third category of applications based on the pre-defined set of rules.

Further, the pre-defined set of rules is defined based on a current location of a user accessing the one or more applications of the plurality of applications 102. In addition, the pre-defined set of rules is defined based on current time of accessing the one or more applications of the plurality of applications 102. Moreover, the pre-defined set of rules is defined based on a gender of the user accessing the one or more applications of the plurality of applications 102. Furthermore, the pre-defined set of rules is defined based on an age of the user accessing the one or more applications of the plurality of applications 102. In an embodiment of the present disclosure, the pre-defined set of rules is set by an administrator associated with the application integrating system 108. In another embodiment of the present disclosure, the pre-defined set of rules is set by the application provider associated each of the plurality of applications 108.

In an embodiment of the present disclosure, the location based rule is defined for checking availability of service each of the plurality of applications 102 in a particular area where each of the plurality of applications is accessed. In an embodiment of the present disclosure, the time based rule is defined checking availability of services associated with each of the plurality of applications 102 on a current time of accessing the plurality of applications 102. In an embodiment of the present disclosure, the gender based rules and the age based rule is defined for users belonging to a specific gender and age group who have accessed the plurality of applications 102.

In an embodiment of the present disclosure, the application provider provides the pre-defined set of rules to the administrator of the application integrating system 108. In an embodiment of the present disclosure, the pre-defined set of rules set by both the administrator of the application integrating system 108 and the application provider are taken into account for performing the association. In an embodiment of the present disclosure, the association engine 212 takes a decision for associating the one or more application programming interfaces associated with a particular common category of applications with the one or more application programming interfaces associated with another particular common category of applications in real time.

In an embodiment of the present disclosure, the association is performed for enabling each application provider to utilize services of other application providers through their application programming interfaces in order to enable the plurality of users to access services of various applications on a single application. In an embodiment of the present disclosure, the number of applications currently providing service through the single application is based on the pre-defined set of rules. In an embodiment of the present disclosure, the application integrating system 108 enables each application provider to deal with another application provider through the application programming interfaces 104a.

In an embodiment of the present disclosure, each application provider may deal with a plurality of application providers through the application integrating system 108. In an embodiment of the present disclosure, the application provider may deal with a selected number of application providers based on their choice.

Extending the above stated example, the association engine 212 enables cross linking of the application programming interface AP1 associated with the category of application C1 with the application programming interface AP3 and the application programming interface AP4 associated with the category of application C2. Moreover, the association engine 212 links the application programming interface AP1 associated with the category of application C1 with the application programming interface AP5 and the application programming interface AP6 associated with the category of application C3. In addition, the association engine 212 links the application programming interface AP1 associated with the category of application C1 with the application programming interface AP3 and the application programming interface AP4 associated with the category of application C2 and with the application programming interface AP5 and the application programming interface AP6 associated with the category of application C3. Further, the association engine 212 links the application programming interface AP1 associated with the category of application C1 with the application programming interface AP3 associated with the category of application C2 and the application programming interface AP5 associated with the category of application C3 only based on the pre-defined set of rules.

Going further, the database 214 stores the application programming interface associated with each of the plurality of applications 102 and each of the classified application programming interfaces. In addition, the database 214 stores each of the unified application programming interfaces and each of the associated application programming interfaces and the pre-determined set of rules.

It may be noted that in FIG. 2, various modules of the application integrating system 108 are shown that illustrates the working of the application integrating system 108; however those skilled in the art would appreciate that the application integrating system 108 may have more number of modules that could illustrate overall functioning of the application integrating system 108.

Figure 3A:
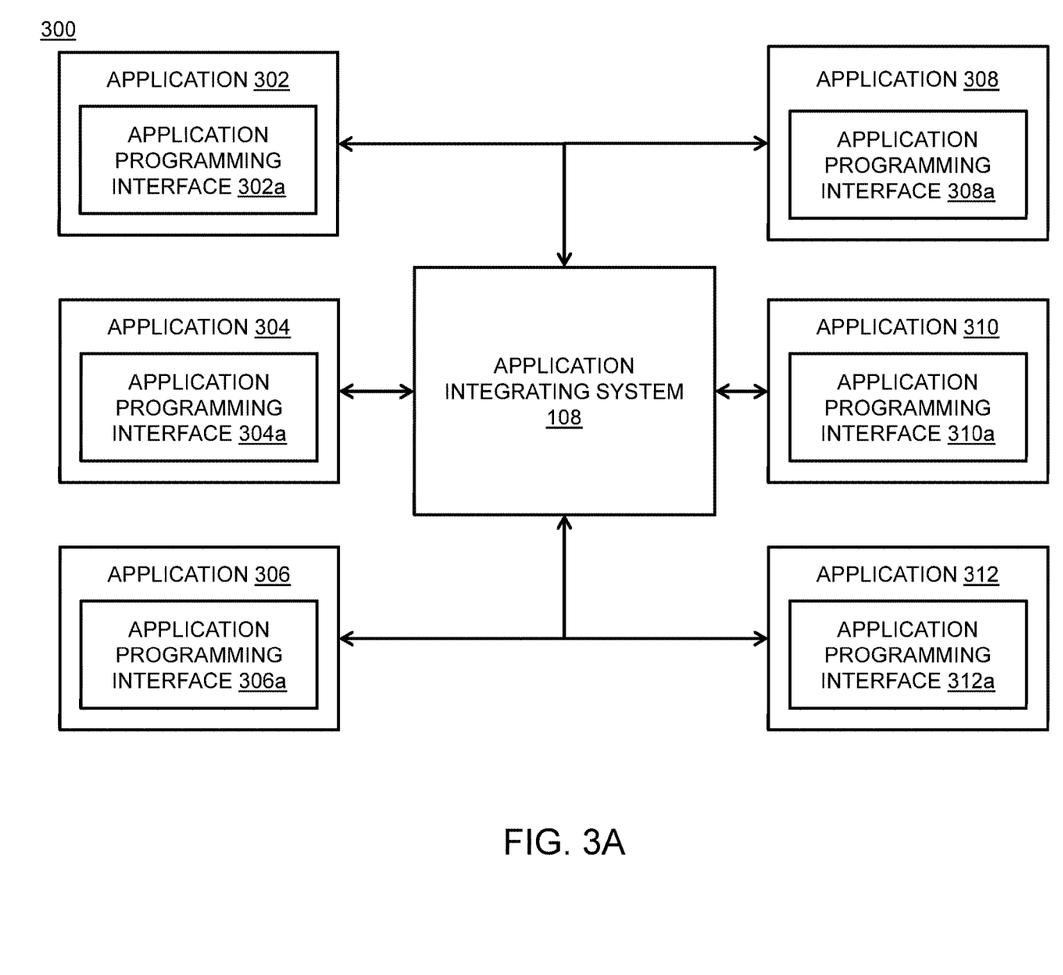
FIG. 3A and FIG. 3B illustrate a block diagram for showing an example of association of the plurality of applications, in accordance with various embodiments of the present disclosure.

FIG. 3A illustrates a block diagram 300 for showing an example of the cross linking of the one or more applications associated with the corresponding category of the one or more categories of applications, in accordance with various embodiments of the present disclosure. It may be noted that to explain the system elements of FIG. 3A, references will be made to the system elements of FIG. 1 and FIG. 2. The block diagram 200 includes an application 302, an application 304, an application 306, an application 308, an application 310, an application 312 and an application integrating system 108. In addition, the block diagram 300 shows the cross linking between two different categories of applications.

Further, the application 302 is associated with an application programming interface 302a, the application 304 is associated with an application programming interface 304a, the application 306 is associated with an application programming interface 306a, the application 308 is associated with an application programming interface 308a, the application 310 is associated with an application programming interface 310a and the application 312 is associated with an application programming interface 312a. Moreover, in an embodiment of the present disclosure, the application programming interface 302a, the application programming interface 304a and the application programming interface 306a are associated with the first category of application.

Further, in an embodiment of the present disclosure, the application programming interface 308a, the application programming interface 310a and the application programming interface 312a are associated with the second category of application. The application integrating system 108 fetches the application programming interface 302a, the application programming interface 304a, the application programming interface 306a, the application programming interface 308a, the application programming interface 310a and the application programming interface 312a. In addition, the application programming interface 108 consolidates the application programming interface 302a, the application programming interface 304a, the application programming interface 306a, the application programming interface 308a, the application programming interface 310a and the application programming interface 312a.

Moreover, the application integrating system 108 categorizes the application programming interface 302a, the application programming interface 304a and the application programming interface 306a into the first category of application and categorizes the application programming interface 308a, the application programming interface 310a and the application programming interface 312a into the second category of application. Further, the application integrating system 108 links the application programming interface 302a, the application programming interface 304a and the application programming interface 306a associated with the first category of application with the application programming interface 308a, the application programming interface 310a and the application programming interface 312a.

In an embodiment of the present disclosure, the application integrating system 108 links the application programming interface 302a with the application programming interface 308a, the application programming interface 310a and the application programming interface 312 based on the pre-defined set of rules. In another embodiment of the present disclosure, the application integrating system 108 links the application programming interface 302a with the application programming interface 308a and the application programming interface 310a based on the pre-defined set of rules. In yet another embodiment of the present disclosure, the application integrating system 108 links the application programming interface 302a with the application programming interface 308a and the application programming interface 312a based on the pre-defined set of rules.

In yet another embodiment of the present disclosure, the application integrating system 108 links the application programming interface 302a with the application programming interface 310a and the application programming interface 312a based on the pre-defined set of rules.

Figure 3B:
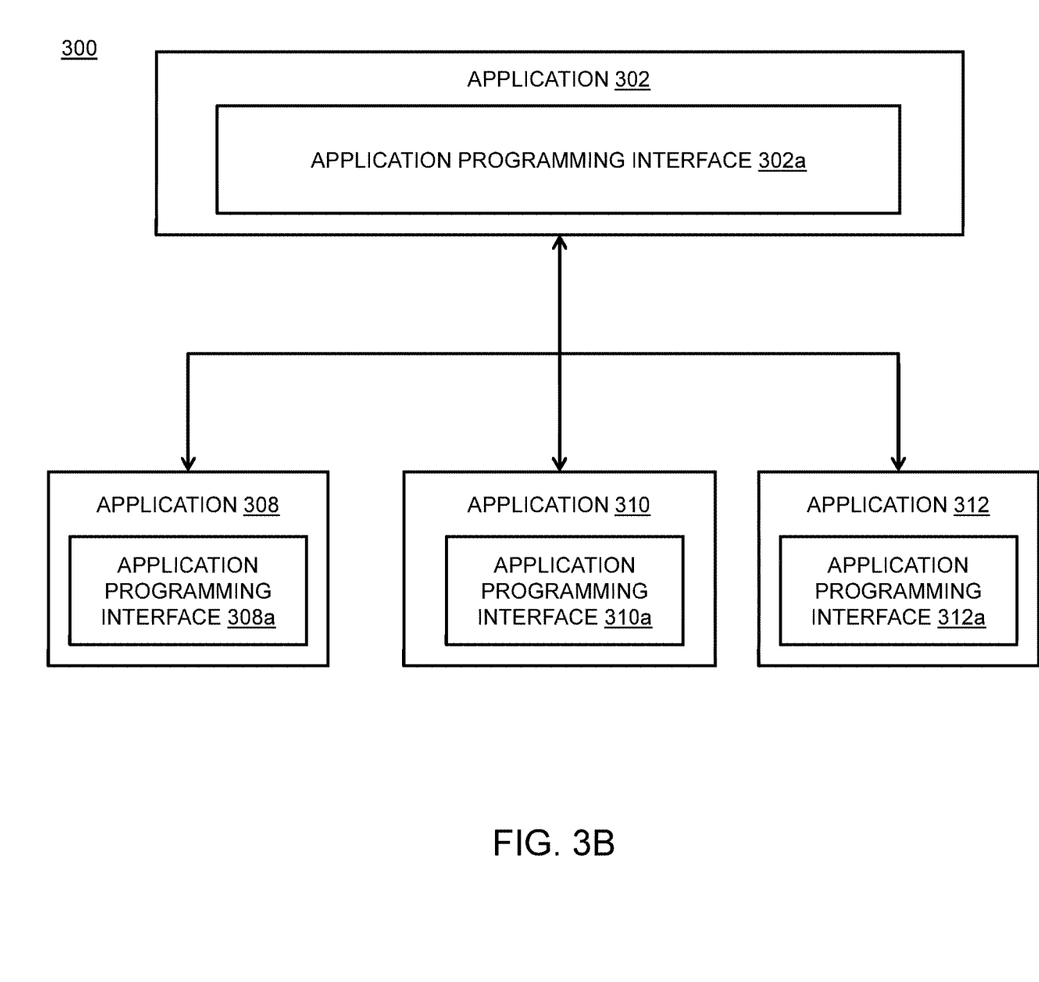

FIG. 3B illustrates a block diagram 200 for showing cross linking of the plurality of applications, in accordance with various embodiments of the present disclosure. It may be noted that to explain the system elements of FIG. 3B, references will be made to the system elements of FIG. 1, FIG. 2 and FIG. 3A. In addition, the block diagram 200 shows the cross linking of a single application (the application 302) associated with the first category of application with the one or more applications (the application 308, the application 310 and the application 312) associated with the second category of applications.

Going further, the application integrating system 108 links the application programming interface 302a associated with the application 302 with the application programming interface 308a associated with the application 308, the application programming interface 310a associated with the application 310 and the application programming interface 312a associated with the application 312. In an embodiment of the present disclosure, the application integrating system 108 enables the application provider associated with the application 302 to utilize services and functions of the application 308, the application 310 and the application 312 through the corresponding application programming interface 308a, the corresponding application programming interface 310a and the corresponding application programming interface 312a.

In an embodiment of the present disclosure, the application integrating system 108 may link the application programming interface 302a with a selective number of application programming interfaces of the application programming interface 308a, the application programming interface 310a and the application programming interface 312a based on the pre-defined set of rules. In an embodiment of the present disclosure, the application provider associated with the application 302 may or may not display service from each of the applications 308-312 based on a choice of the application provider. For example, a user A accesses an application X integrated with an application Y through an application programming interface Y1 and an application Z through an application programming interface Z1. The application integrating system 108 checks the current location of the user A and finds that the services of the application Y are not available in the current location. The application integrating system 108 displays or enables services of the application Z only on the application X based on the current location.

In another example, the application integrating system 108 checks the current time (say, 9.30 pm) at which the user A accesses the application X and determines that the application Z does not provide service at the current time. The application integrating system 108 displays or enables services of the application Y only on the application X based on the current time.

Figure 3C:
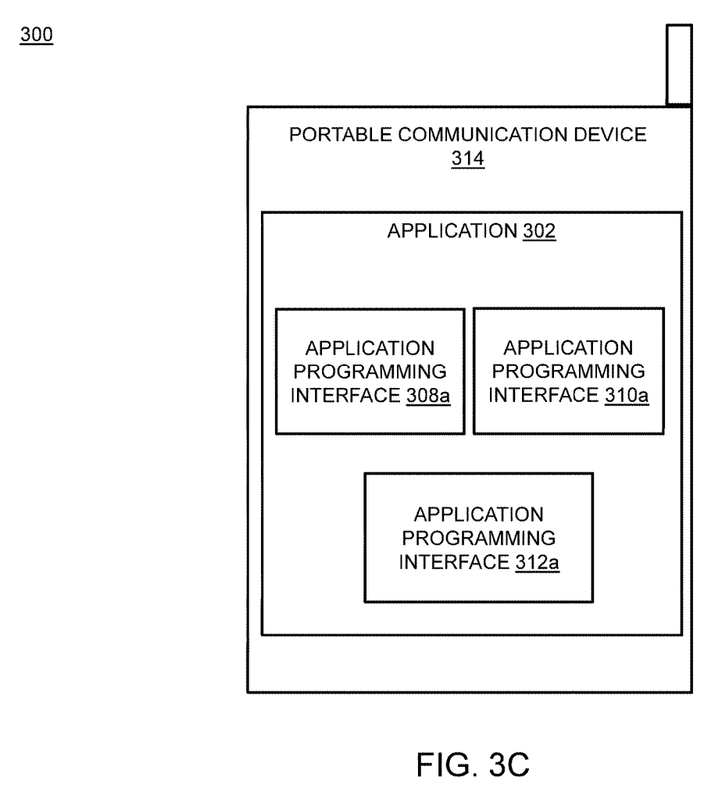
FIG. 3C illustrates a portable communication device for showing the association of the plurality of applications, in accordance with various embodiments of the present disclosure.

FIG. 3C illustrates a portable communication device 314 for showing the cross linking of the plurality of applications, in accordance with various embodiments of the present disclosure. It may be noted that to explain the system elements of FIG. 3C, references will be made to the system elements of FIG. 1, FIG. 2, FIG. 3A and FIG. 3B. The portable communication device 314 includes the application 302 installed on the portable communication device 314. In addition, the portable communication device 314 includes a smart phone, a tablet, a laptop and the like. In an embodiment of the present disclosure, the portable communication device 314 is associated with a specific type of operating system.

Going further, the application programming interface 302a associated with the application 302 is linked with the application programming interface 308a, the application programming interface 310a and the application programming interface 312a. In addition, the application 302 is accessed by the user of a plurality of users presently in any location and on a specified time for requesting any service. The application integrating system 108 checks the current location and the current time of the access of the application 302 and determines that the services of each the application 308, the application 310 and the application 312 is available in the present location and the present time.

The application integrating system 108 displays the services of each of the application 308, the application 310 and the application 312 on the application 302 on a screen of the portable communication device 314. The user may choose services from any application based on his/her choice.

Figure 4:
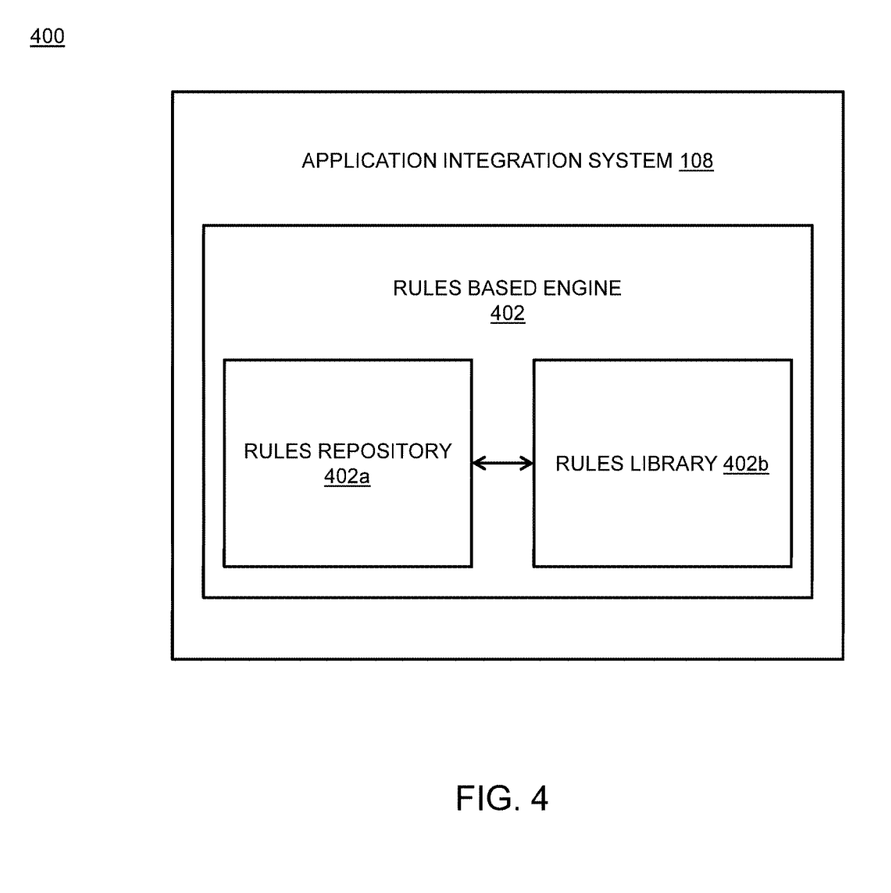
FIG. 4 illustrates an additional component of an application integrating system, in accordance with various embodiments of the present disclosure.

FIG. 4 illustrates a block diagram 400 for showing an additional component of the application integrating system 108, in accordance with various embodiments of the present disclosure. The additional component of the application integrating system 108 includes a rules based engine 402. In addition, the rules based engine 402 is configured to define the pre-defined set of rules for enabling the cross linking of the plurality of applications 102.

In an embodiment of the present disclosure, the administrator associated with the application integrating system 108 sets the pre-defined set of rules though the rules based engine 402. In an embodiment of the present disclosure, the pre-defined set of rules is updated through the rules based engine 402. In an embodiment of the present disclosure, the pre-defined set of rules is stored in the rules based engine 402. In addition, the rules based engine 402 includes a rules repository 402a and a rules library 402b. Moreover, the rules repository 402a stores the pre-defined set of rules and the rules library 402b is used for setting the pre-defined set of rules.

Figure 5:
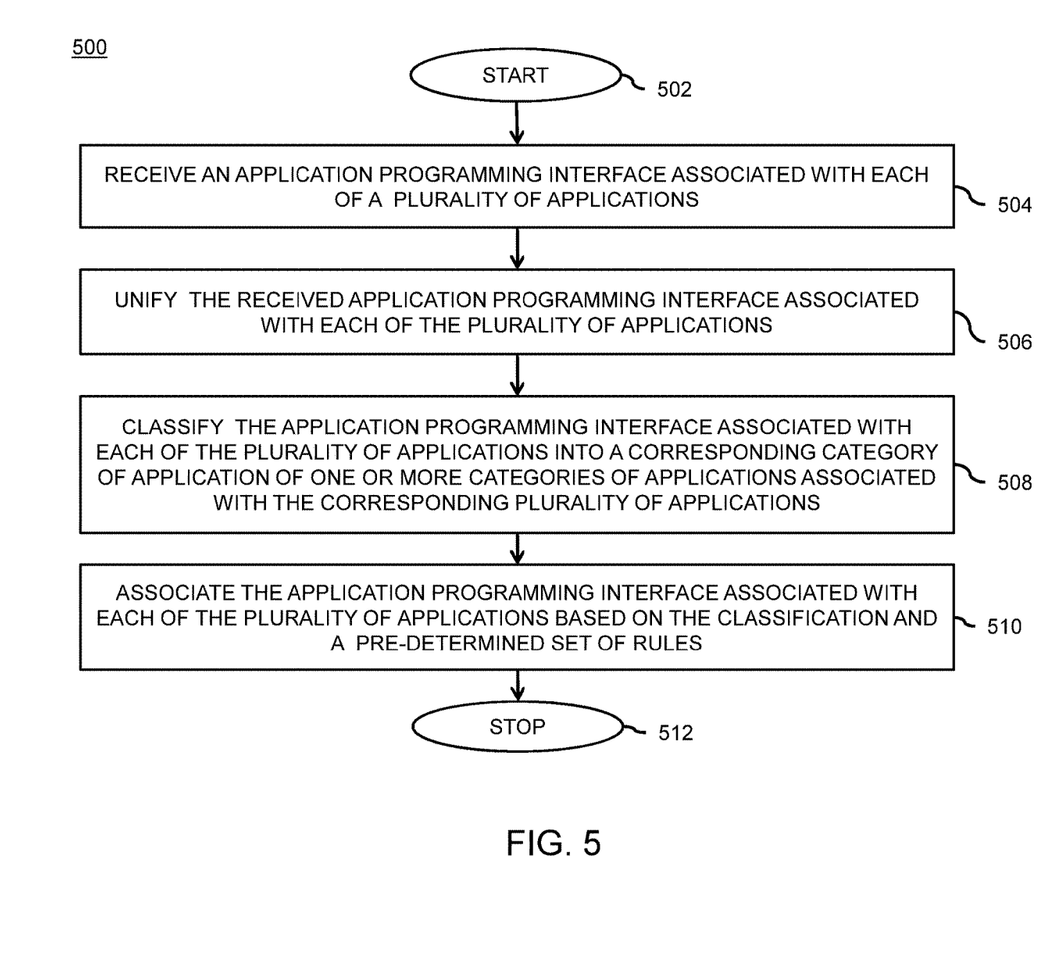
FIG. 5 illustrates a flowchart for the association of the plurality of applications, in accordance with various embodiments of the present disclosure.

FIG. 5 illustrates a flowchart 500 for the association of the plurality of applications 102, in accordance with various embodiments of the present disclosure. It may be noted that to explain the process steps of the flowchart 500, references will be made to the system elements of the FIG. 1 and FIG. 2. The flowchart 500 initiates at step 502. At step 504, the receiving module 204a receives the application programming interface associated with each of the plurality of applications 102. At step 506, the unification module 204b unifies the received application programming interface associated with each of the plurality of applications 102. At step 508, the classification engine 204c classifies the application programming interface associated with each of the plurality of applications 102 into the corresponding category of application of the one or more categories of applications. At step 510, the association engine 204e associates the application programming interface associated with each of the plurality of applications 102 based on the classification and the pre-determined set of rules. Furthermore, the association is done by cross linking the application programming interface associated with each of the plurality of applications 102. The flowchart 500 terminates at step 512.

It may be noted that the flowchart 500 is explained to have above stated process steps; however, those skilled in the art would appreciate that the flowchart 300 may have more/less number of process steps which may enable all the above stated embodiments of the present disclosure.

Figure 6:
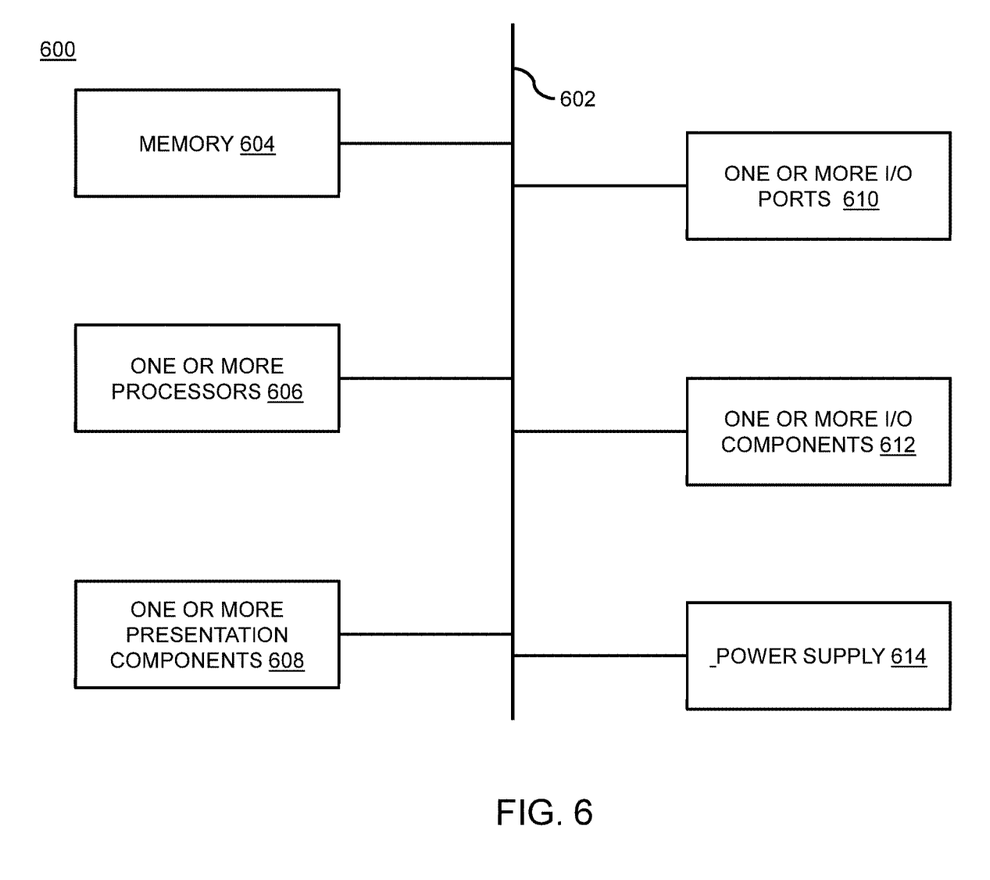
FIG. 6 illustrates a block diagram of a computing device, in accordance with various embodiments of the present disclosure.

FIG. 6 illustrates a block diagram of a computing device 600, in accordance with various embodiments of the present disclosure. The computing device 600 includes a bus 602 that directly or indirectly couples the following devices: memory 604, one or more processors 606, one or more presentation components 608, one or more input/output (I/O) ports 610, one or more input/output components 612, and an illustrative power supply 614. The bus 602 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 6 is merely illustrative of an exemplary computing device 600 that can be used in connection with one or more embodiments of the present invention. Distinction is not made between such categories as "workstation," "server," "laptop," "hand-held device," etc., as all are contemplated within the scope of FIG. 6 and reference to "computing device." The computing device 600 typically includes a variety of computer-readable media. The computer-readable media can be any available media that can be accessed by the computing device 600 and includes both volatile and nonvolatile media, removable and non-removable media. By way of example, and not limitation, the computer-readable media may comprise computer storage media and communication media. The computer storage media includes volatile and nonvolatile, removable and non-removable media implemented in any method or technology for storage of information such as computer-readable instructions, data structures, program modules or other data. The computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 600. The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 604 includes computer-storage media in the form of volatile and/or nonvolatile memory. The memory 604 may be removable, non-removable, or a combination thereof. Exemplary hardware devices include solid-state memory, hard drives, optical-disc drives, etc. The computing device 600 includes one or more processors that read data from various entities such as memory 604 or I/O components 612. The one or more presentation components 608 present data indications to a user or other device. Exemplary presentation components include a display device, speaker, printing component, vibrating component, etc. The one or more I/O ports 610 allow the computing device 600 to be logically coupled to other devices including the one or more I/O components 612, some of which may be built in. Illustrative components include a microphone, joystick, game pad, satellite dish, scanner, printer, wireless device, etc.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

What is claimed is:

1. A computer-readable storage medium encoding computer executable instructions that, when executed by at least one processor, performs a method for associating a plurality of applications, the method comprising:
   receiving, at a computing device, an application programming interface associated with each of the plurality of applications;
   unifying, at the computing device, the received application programming interface associated with each of the plurality of applications;
   classifying, at the computing device, the application programming interface associated with each of the plurality of applications into a corresponding category of application of one or more categories of applications associated with the corresponding plurality of applications; and associating, at the computing device, the application programming interface associated with each of the plurality of applications based on the classification and a pre-determined set of rules, wherein the associating being done by cross linking the application programming interface associated with each of the plurality of applications.

2. The computer readable storage medium of claim 1, further comprising instructions for determining, at the computing device, the corresponding category of application for the application programming interface associated with each of the plurality of applications and wherein each of the plurality of applications being an on demand service application.

3. The computer readable storage medium of claim 1, wherein one or more application programming interfaces associated with a first category of application being cross linked with one or more application programming interfaces associated with a second category of applications, wherein the first category of application being distinct from the second category class of application.

4. The computer readable storage medium of claim 3, wherein the one or more application programming interfaces associated with the first category of application being cross linked with one or more application programming interfaces associated with a plurality of categories of applications, wherein the first category of application being distinct from each of the plurality of categories of applications and wherein each category of application of the plurality of categories of application being a distinct category of application.

5. The computer readable storage medium of claim 1, wherein the pre-determined set of rules being defined based on a current location of a user accessing one or more applications of the plurality of applications, a current time of accessing the one or more applications of the plurality of applications, a gender of the user accessing the one or more applications of the plurality of applications and an age of the user accessing the one or more applications of the plurality of applications.

6. The computer readable storage medium of claim 1, wherein the pre-determined set of rules being set by an administrator.

7. The computer readable storage medium of claim 1, wherein the pre-determined set of rules being set by an application provider associated with each of the plurality of applications.

8. The computer readable storage medium of claim 1, wherein the application programming interface associated with each of the plurality of applications being received from a corresponding application server of a plurality of application servers associated with the corresponding plurality of applications.

9. The computer readable storage medium of claim 1, further comprising instructions for generating, at the computing device, a common application programming interface for each of one or more application programming interfaces classified into a corresponding similar category of application.

10. The computer readable storage medium of claim 1, further comprising instructions for storing, at the computing device, the application programming interface associated with each of the plurality of applications, each of the classified application programming interface, each of the unified application programming interfaces, each of the associated application programming interfaces and the pre-determined set of rules.

\* \* \* \* \*